(12) United States Patent
Aoyagi et al.

(10) Patent No.: US 8,953,558 B2
(45) Date of Patent: Feb. 10, 2015

(54) MOBILE COMMUNICATION SYSTEM, RADIO CONTROL APPARATUS, CORE NETWORK APPARATUS, MOBILE COMMUNICATION TERMINAL AND MOBILE COMMUNICATION METHOD

(75) Inventors: Kenichiro Aoyagi, Yokosuka (JP); Yuichiro Nakamura, Yokosuka (JP); Yasuhiro Kawabe, Yokosuka (JP); Hideyuki Matsutani, Yokohama (JP)

(73) Assignee: NTT DOCOMO, INC., Tokyo (JP)

( * ) Notice: Subject to any disclaimer, the term of this patent is extended or adjusted under 35 U.S.C. 154(b) by 109 days.

(21) Appl. No.: 13/508,423

(22) PCT Filed: Nov. 5, 2010

(86) PCT No.: PCT/JP2010/069725
§ 371 (c)(1),
(2), (4) Date: Jun. 28, 2012

(87) PCT Pub. No.: WO2011/055793
PCT Pub. Date: May 12, 2011

(65) Prior Publication Data
US 2012/0263146 A1    Oct. 18, 2012

(30) Foreign Application Priority Data
Nov. 6, 2009  (JP) .................................. 2009-255572

(51) Int. Cl.
*H04W 4/00* (2009.01)
*H04W 36/00* (2009.01)
*H04W 48/02* (2009.01)

(52) U.S. Cl.
CPC .................................... *H04W 48/02* (2013.01)
USPC .......................................... 370/331; 455/436

(58) Field of Classification Search
None
See application file for complete search history.

(56) References Cited

U.S. PATENT DOCUMENTS

| | | | |
|---|---|---|---|
| 2004/0106430 A1* | 6/2004 | Schwarz et al. | ............ 455/552.1 |
| 2005/0083893 A1* | 4/2005 | Purkayastha et al. | ......... 370/338 |
| 2005/0272428 A1 | 12/2005 | Tanabe et al. | |
| 2007/0264994 A1 | 11/2007 | Schwarz et al. | |
| 2011/0009113 A1* | 1/2011 | Vikberg et al. | ............ 455/422.1 |

FOREIGN PATENT DOCUMENTS

| | | |
|---|---|---|
| CN | 1617609 A | 5/2005 |
| CN | 1666554 A | 9/2005 |
| CN | 1708176 A | 12/2005 |
| EP | 1 528 715 A1 | 5/2005 |
| JP | 2005 137013 | 5/2005 |

(Continued)

OTHER PUBLICATIONS

Office Action issued Jul. 23, 2013 in Japanese Patent Application No. 2011-539403 with English language translation.

(Continued)

*Primary Examiner* — Ashley Shivers
(74) *Attorney, Agent, or Firm* — Oblon, Spivak, McClelland, Maier & Neustadt, L.L.P.

(57) ABSTRACT

The first communication system is configured to determine whether or not to provide information that instructs the UE 10 to connect to the second communication system, based on a subscriber identifier allocated to the UE 10. The subscriber identifier is configured to identify whether or not the UE 10 is allowed to utilize the second communication system.

6 Claims, 4 Drawing Sheets

(56) References Cited

FOREIGN PATENT DOCUMENTS

| JP | 2006 20270 | 1/2006 |
|---|---|---|
| WO | WO 2007/038781 A1 | 4/2007 |

OTHER PUBLICATIONS

3GPP TSG-RAN WG2 Meeting #63 xR2-084694, "UE Capabilities and redirection (UTRA-LTE)," Nokia Corporation, Nokia Siemens Network, Total 53 Pages, (Aug. 18-22, 2008).

3GPP TS 25.331 V9.0.0, "3$^{rd}$ Generation Partnership Project; Technical Specification Group Radio Access Network; Radio Resource Control (RRC); Protocol Specification," Total 1711 pages, (Sep. 2009).

International Search Report Issued Feb. 1, 2011 in PCT/JP10/69725 Filed Nov. 5, 2010.

Chinese Office Action issued Mar. 31, 2014 in Chinese Application No. 201080050082.0 with English translation, 13 pages.

Japanese Office Action issued Apr. 8, 2014 in Japanese Application No. 2011-539403 with English translation, 8 pages.

\* cited by examiner

SUBSCRIBER IDENTIFIER

▨ ··· SPECIFIC BIT STRING

FIG. 4

IDENTIFIER SPACE OF SUBSCRIBER IDENTIFIER

▨ ··· WITH CONTRACT
☐ ··· WITH NO CONTRACT

MOBILE COMMUNICATION SYSTEM, RADIO CONTROL APPARATUS, CORE NETWORK APPARATUS, MOBILE COMMUNICATION TERMINAL AND MOBILE COMMUNICATION METHOD

TECHNICAL FIELD

The present invention relates to: a mobile communication system including a first communication system and a second communication system; a radio control apparatus, a core network apparatus, and a mobile communication terminal which are provided in a mobile communication system; as well as a mobile communication method which is used in a mobile communication system.

BACKGROUND ART

The following procedure (RRC CONNECTION REJECT with redirection) has been known as a procedure for a mobile communication terminal (UE) to establish a connection from a first communication system (first RAT (Radio Access Technology)) to a second communication system (second RAT) in a mobile communication system (for example, non-patent document 1).

First, the mobile communication terminal transmits to the first communication system a radio signal (RRC CONNECTION REQUEST) in which information (pre-redirection info) indicating capability to support the second communication system is set.

Secondly, in response to the radio signal (RRC CONNECTION REQUEST) from the mobile communication terminal, the first communication system transmits a radio signal (RRC CONNECTION REJECT) to instruct the mobile communication terminal to connect to the second communication system (redirection).

PRIOR ART DOCUMENTS

Non-Patent Document

Non-patent document 1: 3GPP TS25. 331 v9. 0. 0

SUMMARY OF THE INVENTION

However, even though the mobile communication terminal has the capability to support the second communication system, it is possible that the mobile communication terminal is not allowed to utilize the second communication system, specifically, the mobile communication terminal has no contract made to utilize the second communication system. In such a case, the connection procedure of the mobile communication terminal to the second communication system is rejected, and the mobile communication terminal returns to the first communication system. However, since the mobile communication terminal still has the capability to support the second communication system, the mobile communication terminal re-transmits the radio signal (RRC CONNECTION REQUEST) in which the information (pre-redirection info) indicating the capability to support the second communication system is set in the first communication system.

Thus, the connection procedure to the second communication system (second RAT) will be repeated (ping pong phenomenon) unless it is considered whether or not the mobile communication terminal has a contract made to utilize the second communication system.

Hence, the present invention has been made to solve the problem described above, and an object of the present invention is to provide a mobile communication system, a radio control apparatus, a core network apparatus, a mobile communication terminal, and a mobile communication method which can prevent repetition of a connection procedure to a second communication system.

A mobile communication system according to the first feature has a mobile communication terminal, a first communication system, and a second communication system. The first communication system is configured to determine whether or not to provide information that instructs the mobile communication terminal to connect to the second communication system, based on a subscriber identifier allocated to the mobile communication terminal. The subscriber identifier is configured to identify whether or not the mobile communication terminal is allowed to utilize the second communication system.

A radio control apparatus according to the second feature is provided in a first communication system in a mobile communication system having a mobile communication terminal, the first communication system, and a second communication system. The radio control apparatus comprising a determination unit configured to determine whether or not to provide information that instructs the mobile communication terminal to connect to the second communication system, based on a subscriber identifier allocated to the mobile communication terminal. The subscriber identifier is configured to identify whether or not the mobile communication terminal is allowed to utilize the second communication system.

A core network apparatus according to the third feature is provided in a mobile communication system having a mobile communication terminal, a first communication system, and a second communication system. The core network apparatus comprising an allocation unit configured to allocate a subscriber identifier to the mobile communication terminal, the subscriber identifier being configured to identify whether or not the mobile communication terminal is allowed to utilize the second communication system.

A mobile communication terminal according to the fourth feature is configured to perform communications with a first communication system and a second communication system in a mobile communication system having the first communication system and the second communication system. The mobile communication terminal comprising a transmission unit configured to configure a subscriber identifier to identify whether or not the mobile communication terminal is allowed to utilize the second communication system, and to transmit a radio signal in which the subscriber identifier is set to the first communication system.

A mobile communication terminal according to the fifth feature is capable of performing communications with a first communication system and a second communication system in a mobile communication system having the first communication system and the second communication system. The mobile communication terminal comprising a setting unit configured that the setting unit does not set information indicating capability to support the second communication system in a radio signal to be transmitted from the mobile communication terminal to the first communication system, when the mobile communication terminal is restricted from utilizing the second communication system, and the setting unit sets the information indicating the capability to support the second communication system in the radio signal to be transmitted from the mobile communication terminal to the first communication system, when the mobile communication system is not restricted from utilizing the second communication system.

A mobile communication method according to the sixth feature is for a mobile communication terminal to perform communications with a first communication system and a second communication system. The mobile communication method comprising a step of causing the first communication system to determine whether or not to provide information that instructs the mobile communication terminal to connect to the second communication system, based on a subscriber identifier allocated to the mobile communication terminal. The subscriber identifier is configured to identify whether or not the mobile communication terminal is allowed to utilize the second communication system.

MODES FOR CARRYING OUT THE INVENTION

A mobile communication system according to embodiments of the present invention will be described hereinafter with reference to the drawings. Note that, a same or similar symbol is assigned to a same or similar part in the following description of the drawings.

It should be noted however that the drawings are schematic, and that a proportion of each dimension and the like differs from an actual one. Therefore, specific dimensions and the like should be determined by considering the following description. In addition, it is needless to say that drawings mutually include any different dimensional relationship or proportion from each other.

[Overview of Embodiment]

First, a mobile communication system according to embodiments has a mobile communication terminal, a first communication system, and a second communication system. The first communication system is configured to determine whether or not to provide information that instructs the mobile communication terminal to connect to the second communication system, based on a subscriber identifier allocated to the mobile communication terminal. The subscriber identifier is configured to identify whether or not the mobile communication terminal is allowed to utilize the second communication system, specifically, whether or not there is any contract (contract with a communication carrier) made for the mobile communication terminal to utilize the second communication system.

Note that, the subscriber identifier is IMSI (International Mobile Subscriber Identity), TMSI (Temporary Mobile Subscriber Identity), or p-TMSI (packet Temporary Mobile Subscriber Identity), for example.

According to the embodiment, the subscriber identifier is configured to identify whether or not there is any contract made to utilize the second communication system. In addition, the first communication system determines whether or not to provide information that instructs the mobile communication terminal to connect to the second communication system, based on the subscriber identifier allocated to the mobile communication terminal. Therefore, repetition of a connection procedure to the second communication system due to absence of a contract made to utilize the second communication system is suppressed.

Secondly, in a mobile communication system having a first communication system and a second communication system, a mobile communication terminal is configured to be capable of communicating with the first communication system and the second communication system. The mobile communication terminal includes a setting unit configured that: the setting unit does not set information indicating capability to support the second communication system in a radio signal to be transmitted from the mobile communication terminal to the first communication system when the mobile communication terminal is restricted from utilizing the second communication system, specifically, when the mobile communication terminal has no contract made to utilize the second communication system; and the setting unit sets the information indicating the capability to support the second communication system in the radio signal to be transmitted from the mobile communication terminal to the first communication system when the mobile communication terminal is not restricted from utilizing the second communication system, specifically, when the mobile communication terminal has an contract made to utilize the second communication system.

According to the embodiment, the mobile communication terminal switches whether or not to set the information indicating the capability to support the second communication system in a radio signal to be transmitted from the mobile communication terminal to the first communication system, depending on whether or not there is a contract made to utilize the second communication system. Therefore, repetition of a connection procedure to the second communication system due to absence of a contract made to utilize the second communication system is suppressed.

[First Embodiment]

(Configuration of Mobile Communication System)

Figure 1:
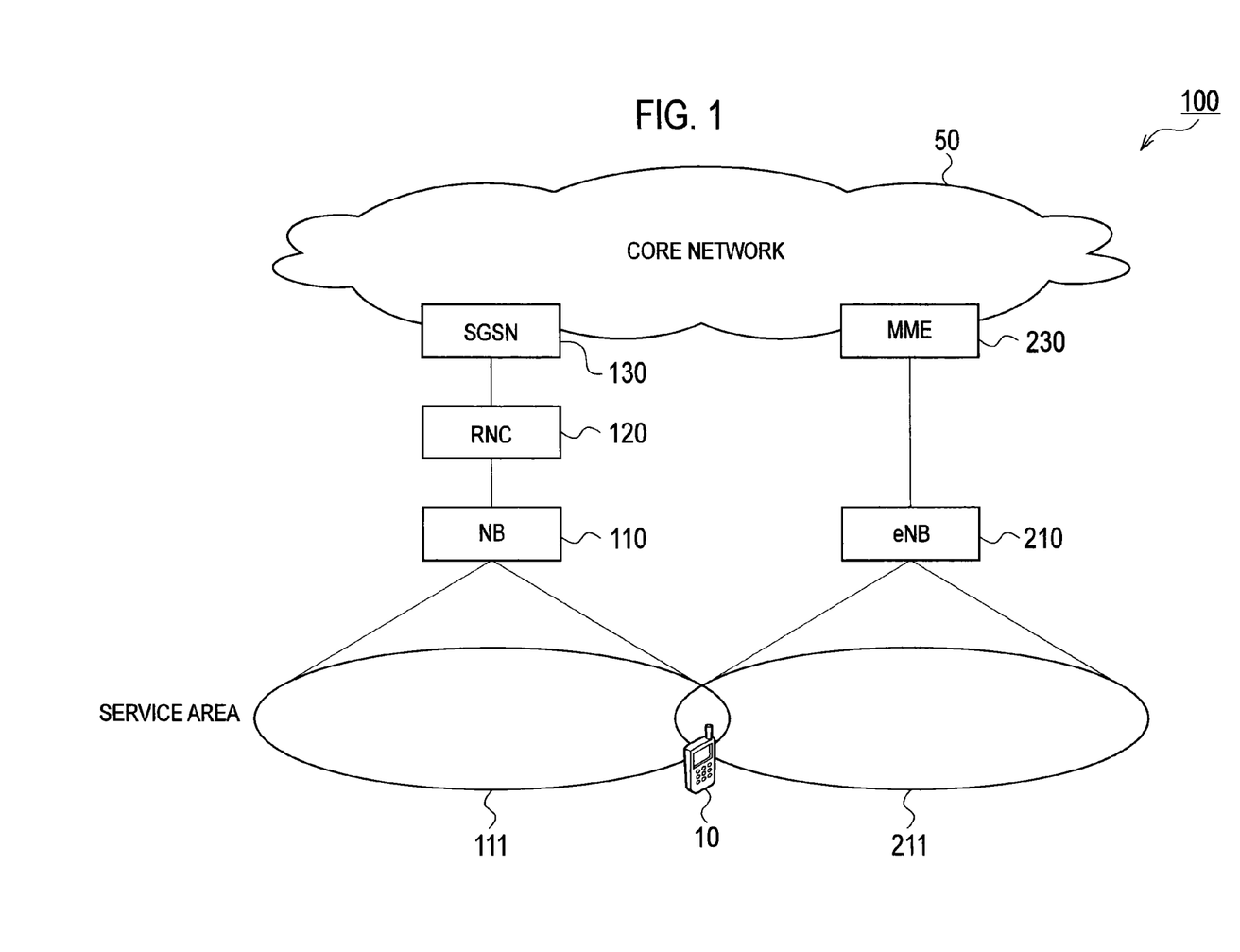
FIG. 1 is a view showing a mobile communication system 100 according to a first embodiment.

A configuration of a mobile communication system according to a first embodiment will be described hereinafter with reference to the drawings. FIG. 1 is a view showing a mobile communication system 100 according to the first embodiment.

As shown in FIG. 1, the mobile communication system 100 includes a communication terminal apparatus 10 (hereinafter referred to as UE 10) and a core network 50. The mobile communication system also includes a first communication system and a second communication system.

The first communication system is a communication system supporting UMTS (Universal Mobile Telecommunication System), for example. The first communication system has a base station 110 (hereinafter referred to as NB 110), an RNC 120, and an SGSN 130. Note that, a first RAT (Radio Access Technology) is used in the first communication system.

The second communication system is a communication system supporting LTE (Long Term Evolution), for example. The second communication system has a base station 210 (hereinafter referred to as eNB 210) and an MME 230, for example. Note that, in the second communication system, a second RAT (Radio Access Technology) is used.

The UE 10 is an apparatus (User Equipment) configured to perform communications with the first communication system and the second communication system. For example, the UE 10 has a function to perform radio communications with the eNB 210 as well as a function to perform radio communications with the NB 110.

The NB 110 has a cell 111, and is an apparatus (NodeB) configured to perform radio communications with the UE 10 existing in the cell 111.

The RNC 120 is connected to the NB 110, and is an apparatus (Radio Network Controller) configured to set radio communications (RRC Connection) with the UE 10 existing in the cell 111.

The SGSN 130 is an apparatus (Serving GPRS Support Node) configured to exchange packets in a packet switching domain. The SGSN is provided in the core network 50. An apparatus (MSC: Mobile Switching Center) configured to switch circuits in a circuit switching domain may also be provided in the core network 50, although it is omitted in FIG. 1.

The eNB 210 has a cell 211, and is an apparatus (evolved NodeB) configured to perform radio communications with the UE 10 existing in the cell 211.

The MME 230 is an apparatus (Mobility Management Entity) configured to manage mobility of the UE 10, which sets radio communication with the eNB 210. The MME 230 is provided in the core network 50.

Note that, it should be appreciated that a cell is a function to perform radio communications with the UE 10. However, a cell may also be considered a service area showing a range in which communications with the cell is enabled. A cell is identified by frequency, a diffusion code, or a time slot and the like to be used in the cell.

(Configuration of Core Network Apparatus)

Figure 2:
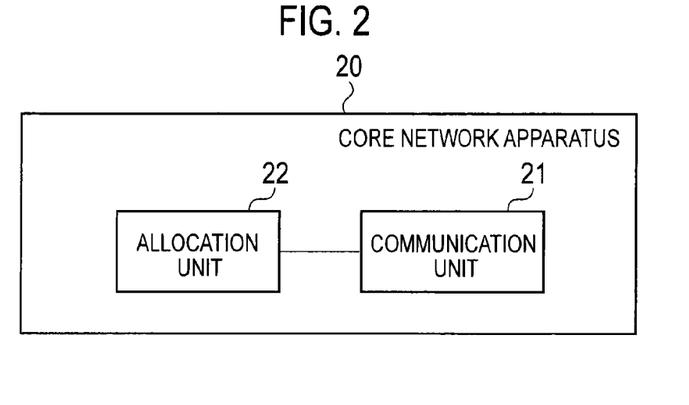
FIG. 2 is a view showing a core network apparatus 20 according to the first embodiment.

A core network apparatus according to the first embodiment will be described hereinafter with reference to the drawings. FIG. 2 is a view showing a core network apparatus 20 according to the first embodiment.

The core network apparatus 20 is an apparatus to be provided in the core network 50. In the first embodiment, the core network apparatus 20 is the SGSN 130, for example. As shown in FIG. 2, the core network apparatus 20 has a communication unit 21 and an allocation unit 22.

The communication unit 21 performs communications with other apparatuses (UE 10, for example). For example, the communication unit 21 notifies the UE 10 of the subscriber identifier to be allocated to the UE 10 by the allocation unit 22 to be described below.

The allocation unit 22 allocates the subscriber identifier to be used in the first communication system, to the UE 10. The subscriber identifier is TMSI (Temporary Mobile Subscriber Identity) or p-TMSI (packet Temporary Mobile Subscriber Identity), for example.

Now, the subscriber identifier is configured to be capable of identifying whether or not the mobile communication terminal is allowed to utilize the second communication system, specifically, whether the UE 10 has a contract made to utilize the second communication system. Note that, although an contract to utilize the second communication system is generally made between the user of the UE 10 and the communication carrier providing communication service by the mobile communication system 100, identification of "whether or not the mobile communication terminal is allowed to utilize the second communication system" is not limited to such an contract, and also includes a case in which the communication carrier sets an authorization to utilize the second communication system for a specific UE 10.

Figure 3:
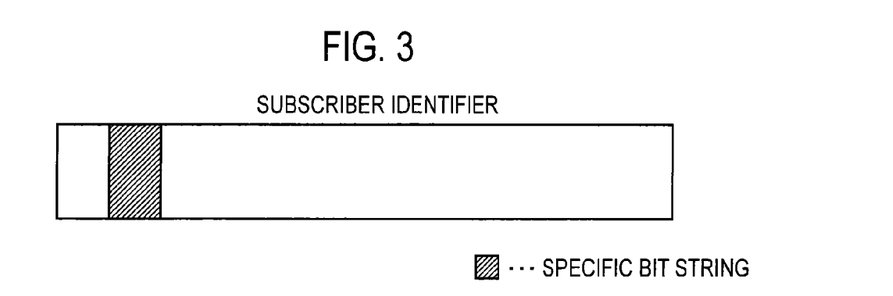
FIG. 3 is a view for explaining a subscriber identifier according to the first embodiment.

In a first example, as shown in FIG. 3, a bit string of the subscriber identifier (length of the bit string is 32 bits, for example) includes a specific bit string indicating whether or not the UE 10 has an contract made to utilize the second communication system. Note that, it is preferable that the specific bit string is provided at the head of the bit string of the subscriber identifier.

If the UE 10 has the contract made to utilize the second communication system, the allocation unit 22 allocates the subscriber identifier including a specific bit string indicating accordingly, to the UE 10. On the one hand, if the UE 10 has no contract made to utilize the second communication system, the allocation unit 22 allocates the subscriber identifier including a specific bit string indicating accordingly, to the UE 10.

Figure 4:
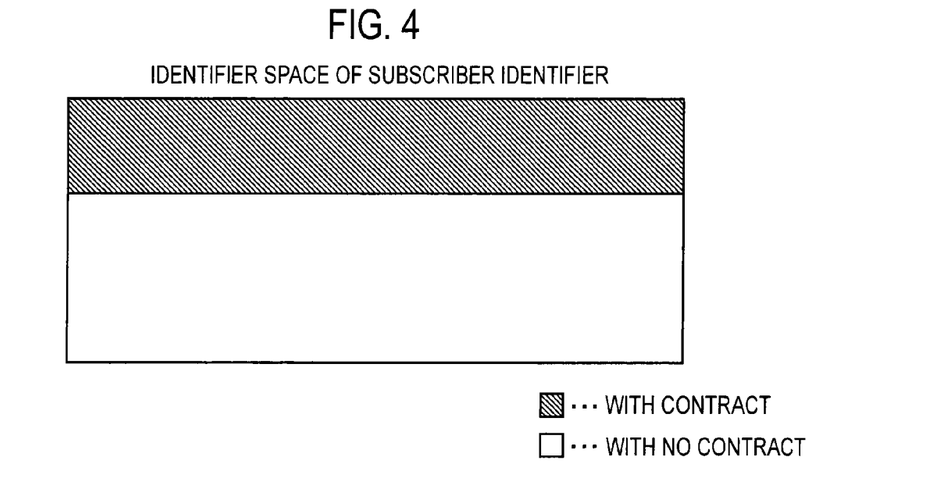
FIG. 4 is a view for explaining the subscriber identifier according to the first embodiment.

In a second example, as shown in FIG. 4, an identifier space of the subscriber identifier that can be allocated to the UE 10 in the first communication system includes an identifier space of the subscriber identifier to be allocated to the UE 10 having an contract made to utilize the second communication system (with an contract) and the identifier space of the subscriber identifier to be allocated to the UE 10 having no contract made to utilize the second communication system (with no contract).

If the UE 10 has a contract made to utilize the second communication system, the allocation unit 22 allocates the subscriber identifier to the UE 10 from the identifier space of the subscriber identifier (with a contract). On the one hand, if the UE 10 has no contract made to utilize the second communication system, the allocation unit 22 allocates the subscriber identifier from the identifier space (with no contract) of the subscriber identifier.

(Configuration of Radio Control Apparatus)

Figure 5:
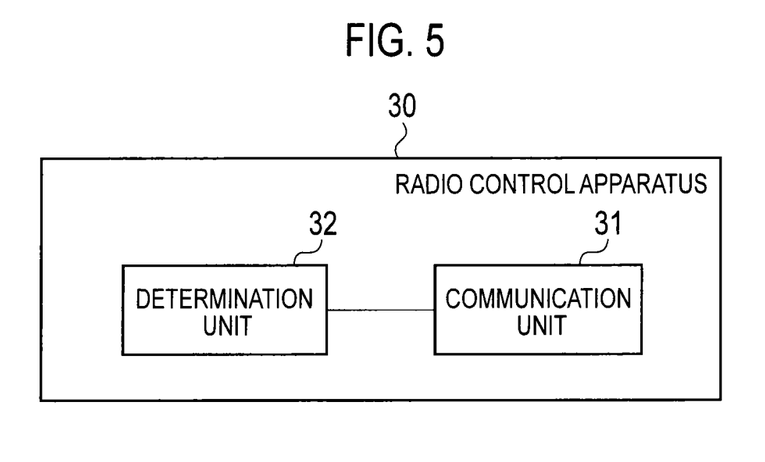
FIG. 5 is a view showing a radio control apparatus 30 according to the first embodiment.

A configuration of the radio control apparatus according to the first embodiment will be described hereinafter with reference to the drawings. FIG. 5 is a view showing the radio control apparatus 30 according to the first embodiment.

In the first embodiment, the radio control apparatus 30 is provided in the first communication system. The radio control apparatus is the RNC 120, for example.

As shown in FIG. 5, the radio control apparatus 30 has a communication unit 31 and a determination unit 32.

The communication unit 31 performs communications with other apparatuses (UE10, for example). The communication unit 31 receives a radio signal (RRC CONNECTION REQUEST, for example) from the UE 10. In addition, the communication unit 30 transmits a radio signal (RRC CONNECTION REJECT, for example) to the UE 10.

Now, the subscriber identifier to be allocated by the core network apparatus 20 is set in "RRC CONNECTION REQUEST" to be transmitted from the UE 10 to the radio control apparatus 30. Information (pre-redirection info) indicating capability to support the second communication system may also be set in "RRC CONNECTION REQUEST."

In addition, "RRC CONNECTION REJECT" to be transmitted from the radio control apparatus 30 to the UE 10 is a radio signal to reject the connection to the first communication system. Information (Redirection info) that instructs the UE 10 to connect to the second communication system (Redirection) may be set in "RRC CONNECTION REJECT" (RRC CONNECTION REJECT with redirection).

The determination unit 32 determines whether or not to instruct the UE 10 to connect to the second communication system (Redirection). To be specific, the determination unit 32 determines whether or not to notify the UE 10 of information (Redirection info) that instructs the UE 10 to connect to the second communication system (Redirection), based on the subscriber identifier allocated to the UE 10.

More specifically, if the UE 10 has a contract made to utilize the second communication system, the determination unit 32 determines to set the information (Redirection info) that instructs the UE 10 to connect to the second communication system (Redirection) in a radio signal (RRC CONNECTION REJECT). On the one hand, if the UE 10 has no contract made to utilize the second communication system, the determination unit 32 determines not to set the information (Redirection info) that instructs the UE 10 to connect to the second communication system (Redirection) in a radio signal (RRC CONNECTION REJECT).

Note that, the determination unit 32 determines whether or not to provide notification of the information (Redirection info) that instructs the UE 10 to connect to the second communication system, based on the information (pre-redirection info) indicating the capability to the second communication system.

Particularly, if the UE 10 has the capability to support the second communication system, the determination unit 32 determines to set the information (Redirection info) that instructs the UE 10 to connect to the second communication system (Redirection) in the radio signal (RRC CONNECTION REJECT). On the one hand, if the UE 10 has no capability to support the second communication system, the determination unit 32 determines not to set the information (Redirection info) that instructs the UE 10 to connect to the second communication system (Redirection) in the radio signal (RRC CONNECTION REJECT).

Specifically, if the UE 10 has the contract made to utilize the second communication system and the capability to support the second communication system, the determination unit 32 determines to instruct the UE 10 to connect to the second communication system (Redirection).

(Configuration of Mobile Communication Terminal)

Figure 6:
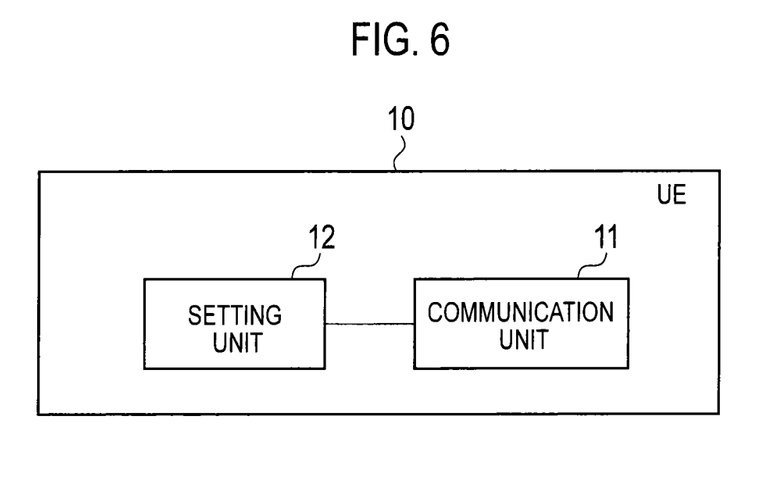
FIG. 6 is a view showing an UE 10 according to the first embodiment.

A configuration of the mobile communication terminal according to the first embodiment will be described hereinafter with reference to the drawings. FIG. 6 is a view showing the UE 10 according to the first embodiment. As shown in FIG. 6, the UE 10 has a communication unit 11 and a setting unit 12.

The communication unit 11 performs radio communications with the NB 110. The communication unit 11 also performs radio communications with the eNB 210. The communication unit 11 transmits a radio signal (RRC CONNECTION REQUEST, for example). The communication unit 11 receives a radio signal (RRC CONNECTION REJECT, for example).

The setting unit 12 sets information (pre-redirection info) indicating capability to support the second communication system in "RRC CONNECTION REQUEST."

Particularly, if the UE 10 has a contract made to utilize the second communication system, the setting unit 12 sets information indicating the capability to support the second communication system in "RRC CONNECTION REQUEST." On the one hand, if the UE 10 has no contract made to utilize the second communication system, the setting unit 12 does not set the information (pre-redirection info) to support the second communication system in "RRC CONNECTION REQUEST."

Note that, the UE 10 manages whether or not the UE 10 has a contract made to utilize the second communication system.

It should be noted that, if the UE 10 determines whether or not to set the information (pre-redirection info) indicating the capability to support the second communication system in "RRC CONNECTION REQUEST," the core network apparatus 20 described above does not need to allocate the subscriber identifier to the UE 10, depending on whether or not there is an contract made to utilize the second communication system.

(Operation of Mobile Communication System)

Figure 7:
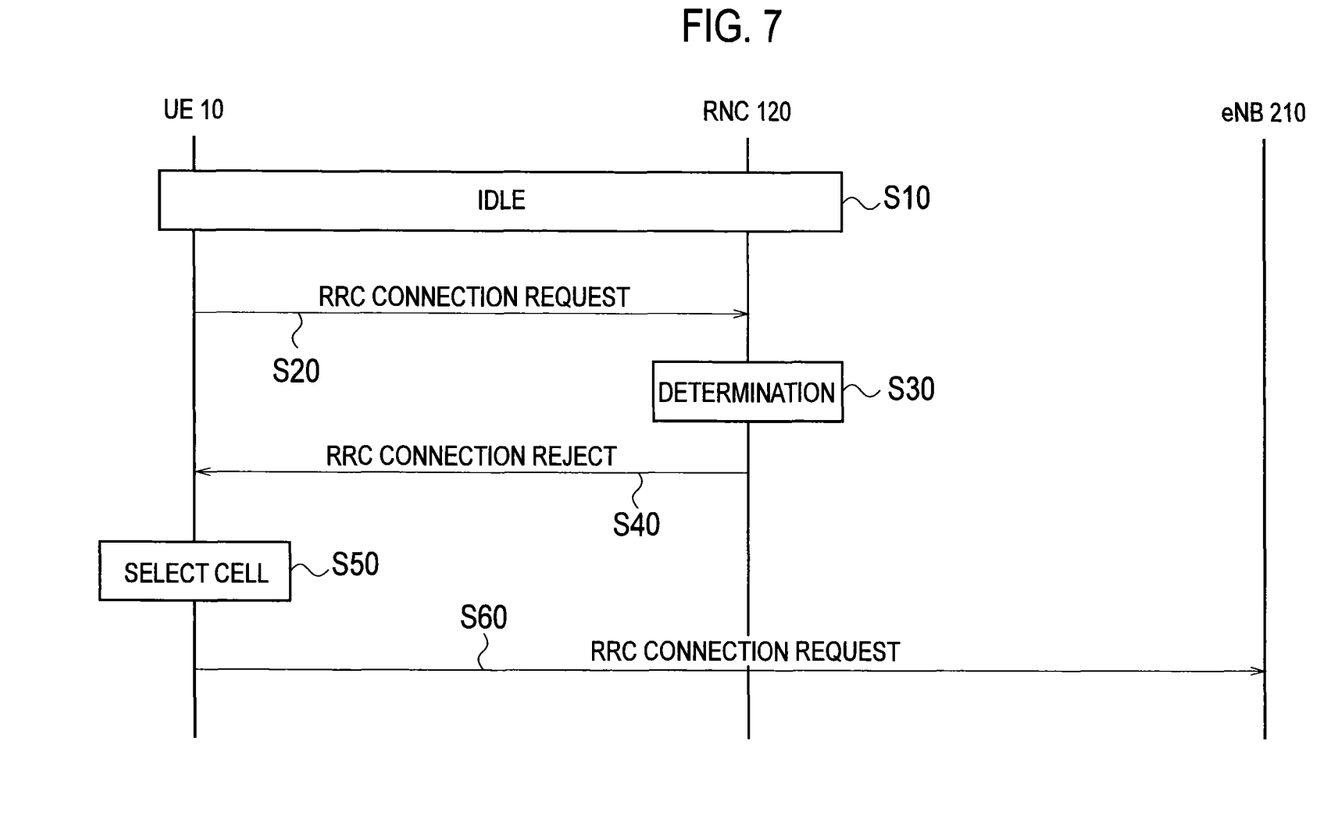
FIG. 7 is a sequence diagram showing operation of the mobile communication system 100 according to the first embodiment.

The operation of the mobile communication system according to the first embodiment will be described hereinafter with reference to the drawings. FIG. 7 is a sequence diagram showing the operation of the mobile communication system 100 according to the first embodiment. Now, the case in which the radio control apparatus 30 is the RNC 120 will be exemplified.

As shown in FIG. 7, in step S10, the UE 10 is in standby state "IDLE."

In step 20, the UE 10 transmits to the RNC 120 a radio signal (RRC CONNECTION REQUEST) to request setting of radio connections. Now, the subscriber identifier is set in "RRC CONNECTION REQUEST." In addition, in the first embodiment, information (pre-redirection info) indicating capability to support the second communication system is set in "RRC CONNECTION REQUEST."

In step 30 the RNC 120 determines whether or not to instruct the UE 10 to connect to the second communication system (Redirection), based on information (subscriber identifier, "pre-redirection info") set in "RRC CONNECTION REQUEST." Specifically, if the UE 10 has a contract made to utilize the second communication system and the capability to support the second communication system, the RNC 120 determines to instruct the UE 10 to connect to the second communication system (Redirection).

Note that, in the following, a description will be continued, assuming that the RNC 120 determined to instruct the UE 10 to connect to the second communication system (Redirection).

In step 40, the RNC 120 transmits to the UE 10 a radio signal (RRC CONNECTION REJECT with redirection) in which the information instructing the connection to the second communication system (Redirection) is set.

In step 50, the UE 10 selects a cell. To be specific, the UE 10 selects a cell provided in the second communication system, using the information (Redirection info) instructing the connection to the second communication system (Redirection).

In step 60, the UE 10 transmits to the eNB 210 a radio signal (RRC CONNECTION REQUEST) to request setting of radio communications.

(Operation and Effect)

First, in the first embodiment, the subscriber identifier (TMSI or p-TMSI, for example) is configured to identify whether or not there is any contract made to utilize the second communication system. In addition, the radio control apparatus 30 provided in the first communication system determines whether or not to provide information (Redirection info) that instructs the mobile communication terminal to connect to the second communication system, based on the subscriber identifier allocated to the UE 10. Therefore, repetition (ping pong phenomenon) of a connection procedure to the second communication system due to absence of a contract made to utilize the second communication system is suppressed.

Secondly, in the second embodiment, depending on whether there is any contract made to utilize the second communication system, the UE 10 switches setting or not setting of information indicating capability to support the second communication system, in a radio signal to be transmitted from the UE 10 to the first communication system. Therefore, repetition (ping pong phenomenon) of the connection procedure to the second communication system due to absence of the contract made to utilize the second communication system is suppressed.

[Other Embodiments]

Although the present invention has been described with the embodiments mentioned above, statement and drawings which form a part of the disclosure should not interpreted as limiting the present invention. From the disclosure, various alternative embodiments, embodiments and operating technologies will be apparent to those skilled in the art.

In the embodiments described above, the first communication system is a communication system supporting UMTS, and the second communication system is a communication system supporting LTE. Specifically, the connection to LTE (Redirection) has been described. However, the embodiments are not limited to this. To be specific, the first communication system may be a communication system supporting LTE, and the second communication system may be a communication system supporting UMTS. Specifically, it may be applied to connections (Redirection) to UMTS.

In addition, the first communication system and the second communication system are not limited to the communication system supporting UMTS or LTE, and may be any other communication system (communication system supporting WiMAX, for example).

In the embodiments described above, as the subscriber identifier, TMSI or p-TMSI to be allocated to the UE 10 by the core network apparatus 20 is exemplified. However, the subscriber identifier may be a subscriber identifier which cannot be allocated to the UE 10 by the core network apparatus 20, such as IMSI (International Mobile Subscriber Identity) and the like.

In the embodiments described above, although the case in which the core network apparatus 20 was the SGSN 130 was exemplified, the embodiment is not limited to this. The core network apparatus 20 maybe an apparatus to be provided in the core network 50.

In the embodiments described above, although the case in which the radio control apparatus 30 is the RNC 120 was exemplified, the embodiment is not limited to this. The radio control apparatus 30 may be an apparatus which is provided in RAN (Radio Access Network) provided in the first communication system.

In the embodiment described above, although no special mention was made, the UE 10 may be configured to make the subscriber identifier so as to identify whether or not there is any contract made to utilize the second communication system, and transmit to the first communication system a radio signal ("RRC CONNECTION REQUEST, " for example) in which the subscriber identifier is set. The UE 10 may be configured to convert the subscriber identifier (TMSI or p-TMSI) allocated by the core network 50 into the subscriber identifier made to identify whether or not there is any contract made to utilize the second communication system, for example. The UE 10 temporarily converts the subscriber identifier when transmitting "RRC CONNECTION REQUEST," for example.

In the embodiments described above, the radio control apparatus 30 determines whether or not to instruct the mobile communication terminal to connect to the second communication system, when the first communication system transmits "RRC CONNECTION REJECT" to the UE 10. However, the embodiment is not limited to this.

To be specific, if the UE 10 is in communication with the first communication system, the radio control apparatus 30 may determine whether or not to instruct the mobile communication terminal to connect to the second communication system, based on the subscriber identifier allocated to the UE 10. For example, the radio control apparatus 30 may set information that instructs the mobile communication terminal to connect to the second communication system, in a radio signal "RRC CONNECTION RELEASE" to release the radio resource of the first communication system. Alternatively, the radio control apparatus 30 may determine whether or not to notify the UE 10 of information that instructs the mobile communication terminal to connect to the second communication system, in handover (Inter-RAT Handover) procedure from the first communication system to the second communication system.

Although no special mention was made in the embodiments described above, allocation of the subscriber identifier according to the embodiment may be used to identify a test terminal prior to development into commercial use. Specifically, the test terminal prior to development into commercial use may be handled as the UE 10 having a contract made to utilize the second communication system.

Note that, the operation of the UE 10 described above may be implemented by hardware or a software module which is executed by a processor, or by a combination thereof.

The software module may be provided in a storage medium of any format such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to a processor so that the processor can read and write information from/into the storage medium. In addition, the storage medium may be integrated in the processor. Furthermore, the storage medium and processor may be provided in an ASIC. The ASIC may be provided in the UE 10. In addition, the storage medium and processor may be provided in the UE 10 as a discrete component.

Note that, Japanese Patent Application No. 2009-255572 (filed on Nov. 6, 2009) is incorporated herein by reference in its entirety.

Industrial Applicability

With the present invention, a mobile communication system, a radio control apparatus, a core network apparatus, a mobile communication terminal, and a mobile communication method which can suppress repetition of a connection procedure to a second communication system can be provided. Therefore, the present invention is useful in radio communications and the like.

Explanation of the Reference Numerals

10 . . . Communication terminal apparatus, 11 . . . Communication unit, . . . Setting unit, 20 . . . Core network apparatus, 21 . . . Communication unit, 22 . . . Allocation unit, 30 . . . Radio control apparatus, 31 . . . Communication unit, 32 . . . Determination unit, 50 . . . Core network, 110 . . . NB, 111 . . . Cell, 120 . . . RNC, 130 . . . SGSN, 210 . . . eNB, 211 . . . Cell, 230 . . . MME, 100 . . . Mobile communication system

The invention claimed is:

1. A mobile communication system comprising:
a mobile communication terminal;
a first communication system;
and a second communication system, wherein
the first communication system is configured to determine whether or not to provide information that instructs the mobile communication terminal to connect to the second communication system, based on a subscriber identifier allocated to the mobile communication terminal, upon a reception of a connection request including information indicating that the mobile communication terminal is capable of supporting the second communication system, the subscriber identifier is configured to identify whether or not the mobile communication terminal is allowed to utilize the second communication system based on an identifier space that includes a first identifier space formed of identifiers to be allocated to mobile communication terminals having a contract to utilize the second communication system and a second identifier space formed of identifiers to be allocated to mobile communication terminals having no contract to utilize the second communication system, and the first communication system is configured not to provide the information that instructs the mobile communication terminal to connect to the second communication system when the mobile communication terminal is identified to have no contract to utilize the second communication system based on the subscriber identifier even if the connection request includes the information indicating that the mobile station is capable of supporting the second communication system.

2. A radio control apparatus provided in a first communication system in a mobile communication system having a mobile communication terminal, the first communication system, and a second communication system, the radio control apparatus comprising:

circuitry configured to determine whether or not to provide notification of information that instructs the mobile communication terminal to connect to the second communication system, based on a subscriber identifier allocated to the mobile communication terminal, upon a reception of a connection request including information indicating that the mobile communication terminal is capable of supporting the second communication system, wherein the subscriber identifier is configured to identify whether or not the mobile communication terminal is allowed to utilize the second communication system based on an identifier space that includes a first identifier space formed of identifiers to be allocated to mobile communication terminals having a contract to utilize the second communication system and a second identifier space formed of identifiers to be allocated to mobile communication terminals having no contract to utilize the second communication system, and the circuitry is configured not to provide the information that instructs the mobile communication terminal to connect to the second communication system, when the mobile communication terminal is identified to have no contract to utilize the second communication system based on the subscriber identifier even if the connection request includes the information indicating that the mobile communication terminal is capable of supporting the second communication system.

3. A core network apparatus provided in a mobile communication system having a mobile communication terminal, a first communication system, and a second communication system, the core network apparatus comprising:

circuitry configured to allocate a subscriber identifier to the mobile communication terminal, the subscriber identifier being configured to identify whether or not the mobile communication terminal is allowed to utilize the second communication system, wherein an identifier space of the subscriber identifier includes a first identifier space formed of identifiers to be allocated to mobile communication terminals having a contract made to utilize the second communication system and a second identifier space formed of identifiers to be allocated to mobile communication terminals having no contract made to utilize the second communication system, and the circuitry is configured to allocate the subscriber identifier selected from the first identifier space to the mobile communication terminal having the contract made to utilize the second communication system.

4. A mobile communication terminal configured to perform communications with a first communication system and a second communication system in a mobile communication system having the first communication system and the second communication system, the mobile communication terminal comprising:

circuitry configured to transmit a connection request set with a subscriber identifier that identifies whether or not the mobile communication terminal is allowed to utilize the second communication system, wherein an identifier space of the subscriber identifier includes a first identifier space formed of identifiers to be allocated to mobile communication terminals having a contract made to utilize the second communication system and a second identifier space formed of identifiers to be allocated to mobile communication terminals having no contract made to utilize the second communication system, the mobile communication terminal is allocated with the subscriber identifier selected from the first identifier space by the core network apparatus when the mobile communication terminal has the contract made to utilize the second communication system, and the circuitry is configured to transmit the connection request to the second communication system when the mobile communication terminal receives information that instructs the mobile communication terminal to connect to the second communication system from the first communication system.

5. A mobile communication terminal capable of performing communications with a first communication system and a second communication system in a mobile communication system having the first communication system and the second communication system, the mobile communication terminal comprising:

circuitry configured to:
not set information indicating capability to support the second communication system in a connection request to be transmitted from the mobile communication terminal to the first communication system, when the mobile communication terminal has no contract made to utilize the second communication system even if the mobile communication terminal has capability to support the second communication system;

set the information indicating the capability to support the second communication system in the connection request to be transmitted from the mobile communication terminal to the first communication system when the mobile communication system has a contract made to utilize the second communication system and also has capability to support the second communication system; and transmit the connection request to the second communication system when the mobile communication terminal receives information that instructs the mobile communication terminal to connect to the second communication system from the first communication system, wherein the mobile communication terminal determines whether there is a contract based on an identifier space that includes a first identifier space formed of identifiers to be allocated to mobile communication terminals having a contract to utilize the second communication system and a second identifier space formed of identifiers to be allocated to mobile communication terminals having no contract to utilize the second communication system.

6. A mobile communication method for a mobile communication terminal to perform communications with a first communication system and a second communication system, the mobile communication method comprising:

a step A of causing the first communication system to determine whether or not to provide information that instructs the mobile communication terminal to connect to the second communication system, based on a subscriber identifier allocated to the mobile communication terminal, upon a reception of a connection request including information indicating that the mobile communication terminal is capable of supporting the second communication system, wherein the subscriber identifier is configured to identify whether or not the mobile communication terminal is allowed to utilize the second communication system based on an identifier space that includes a first identifier space formed of identifiers to be allocated to mobile communication terminals having a contract to utilize the second communication system and a second identifier space formed of identifiers to be allocated to mobile communication terminals having no contract to utilize the second communication system, and in the step A, the first communication system is configured not to provide the information that instructs the mobile communication terminal to connect to the second communication system when the mobile communication terminal is identified to have no contract to utilize the second communication system based on the subscriber identifier even if the connection request includes the information indicating that the mobile communication terminal is capable of supporting the second communication system.

* * * * *